(12) United States Patent
Miller et al.

(10) Patent No.: US 7,367,604 B2
(45) Date of Patent: May 6, 2008

(54) FRONT LATCH ASSEMBLY FOR VEHICLE SEAT CUSHION

(75) Inventors: Michael P. Miller, South Lyon, MI (US); Brent C. Everett, Warren, MI (US); Michael A. Blake, Plymouth, MI (US); Venugopala C. Mittapalli, Farmington, MI (US)

(73) Assignee: Porter Group, LLC, Novi, MI (US)

( * ) Notice: Subject to any disclaimer, the term of this patent is extended or adjusted under 35 U.S.C. 154(b) by 338 days.

(21) Appl. No.: 11/314,105

(22) Filed: Dec. 21, 2005

(65) Prior Publication Data

US 2008/0012379 A1    Jan. 17, 2008

(51) Int. Cl.
*B60N 2/10* (2006.01)
(52) U.S. Cl. .............. 296/65.03; 296/65.05; 297/378.13; 297/336; 248/503.1
(58) Field of Classification Search ......... 296/65.03, 296/65.05; 297/16.1, 378.1, 463.1, 378.13, 297/378.14, 336, 335; 248/503.1
See application file for complete search history.

(56) References Cited

U.S. PATENT DOCUMENTS

| | | | |
|---|---|---|---|
| 6,065,804 A * | 5/2000 | Tanaka et al. ............. 297/336 |
| 6,155,626 A * | 12/2000 | Chabanne et al. ........ 296/65.03 |
| 6,234,574 B1 * | 5/2001 | Hoshihara et al. .......... 297/336 |
| 6,361,098 B1 * | 3/2002 | Pesta et al. ............. 296/65.03 |
| 6,523,899 B1 * | 2/2003 | Tame ........................ 297/331 |
| 6,830,295 B2 * | 12/2004 | Duquesnay et al. ........ 297/336 |
| 6,860,560 B2 | 3/2005 | Chiu et al. |
| 6,945,585 B1 | 9/2005 | Liu et al. |
| 6,974,173 B2 * | 12/2005 | Yokoyama et al. ....... 296/65.03 |
| 6,994,391 B2 * | 2/2006 | Lutzka et al. ............ 296/65.03 |
| 7,073,862 B2 * | 7/2006 | Lavoie ................... 297/378.13 |
| 2003/0155789 A1 * | 8/2003 | Gallienne et al. ........ 296/65.05 |
| 2005/0236862 A1 * | 10/2005 | Martone et al. ......... 296/65.03 |
| 2006/0006687 A1 * | 1/2006 | Jeong ....................... 296/65.03 |
| 2007/0080554 A1 * | 4/2007 | Willing et al. ........... 296/65.03 |

* cited by examiner

Primary Examiner—Jason S Morrow
(74) Attorney, Agent, or Firm—Brooks Kushman P.C.

(57) ABSTRACT

A vehicle seat cushion front latch assembly (32) includes an attachment latch (72) for providing attachment to an associated vehicle and includes a support bracket (78) whose pivotal positioning about a latch plate (66) is controlled by a blocking member (86) prevents movement of the attachment latch (72) to an unlatched condition when the support bracket (78) is moved a predetermined extent from its use position toward a storage position.

18 Claims, 4 Drawing Sheets

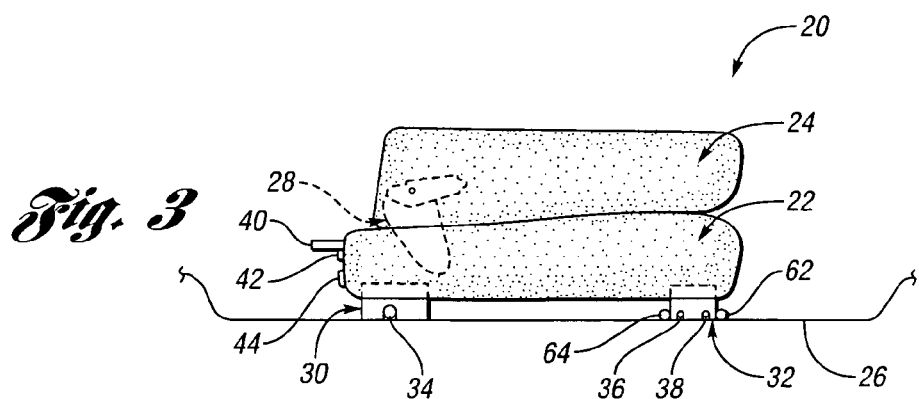
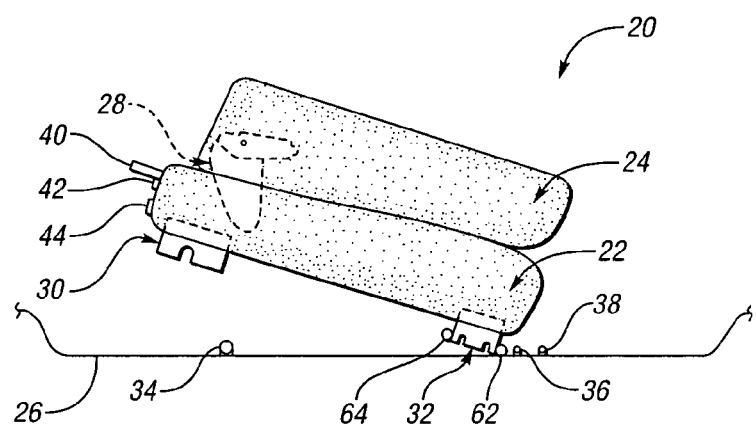
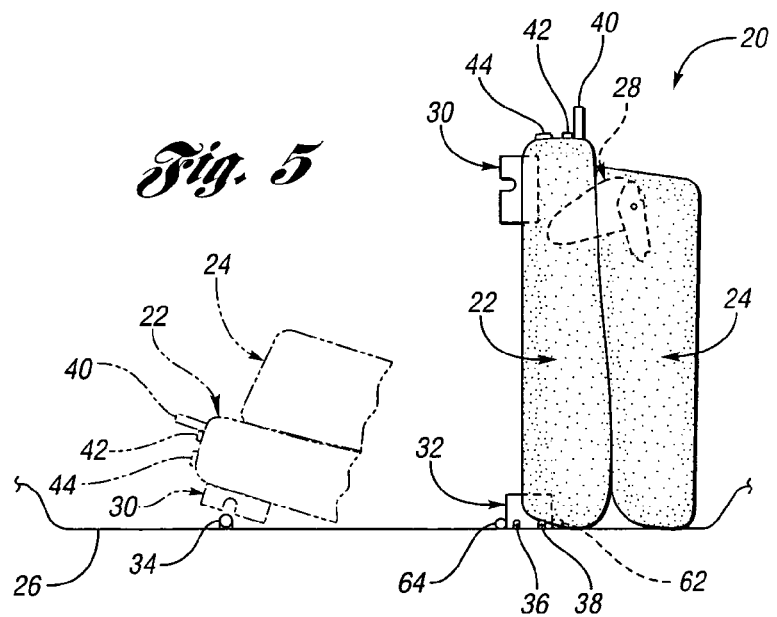

FRONT LATCH ASSEMBLY FOR VEHICLE SEAT CUSHION

BACKGROUND OF THE INVENTION

1. Field of the Invention

This invention relates to a latch assembly for supporting the front end of a vehicle seat cushion on an associated vehicle and selectively permitting either removal of the associated seat or movement to a vertical storage position.

2. Background Art

Vehicle seats conventionally include a seat cushion that is mounted generally horizontally on a vehicle floor and supports a seat back in a generally vertical use position. Latches conventionally support the seat back for angular positioning in either a generally vertical use portion or a horizontal storage position. See, for example, U.S. Pat. No. 6,860,560 Chiu et al., which is assigned to the assignee of the present invention where such a latch is combined with a recliner to provide angular adjustment in the use position. Also, attachment latches have previously been utilized to support the seat cushion on the associated vehicle floor by engagement with floor mounted strikers. Such latches can be actuated to release the seat for removal. See, for example, U.S. Pat. No. 6,945,585 Liu et al., which is also assigned to the assignee of the present invention.

SUMMARY OF THE INVENTION

An object of the present invention is to provide an improved latch assembly for supporting a front end of a vehicle seat cushion of a vehicle seat on an associated vehicle.

In carrying out the above object, the latch assembly of the invention includes a latch plate and an attachment latch having an attachment latch member mounted on the latch plate for movement between a latched position and an unlatched position with respect to a vehicle striker to secure or release the latch plate with respect to the vehicle. A support bracket of the latch assembly is pivotally mounted on the latch plate for pivotal movement about a pivotal axis between a use position and a storage position. The support bracket has a support portion for mounting the front end of the vehicle seat cushion such that pivotal movement of the support bracket between the use and storage positions moves the seat cushion on the associated vehicle between a generally horizontal use position and a generally vertical storage position. A blocking member of the latch assembly permits movement of the attachment latch member from its latched position to its unlatched position when the support bracket is in its use position but blocks movement of the attachment latch member from its latched position to its unlatched position when the support bracket is moved from its use position a predetermined extent toward its storage position to prevent release of the latch assembly and the seat cushion from the vehicle.

The disclosed embodiment of the latch assembly has the attachment latch provided with a pair of attachment latch members pivotally mounted on opposite sides of the latch plate for movement between latched and unlatched positions with respect to the vehicle striker. A first spring biases one of the attachment latch members toward its latched position, and a second spring biases the other attachment latch member toward its latched position and toward contact with the one attachment latch member so as to move therewith to the unlatched position. A pivotal connection has a pivot pin that pivotally mounts the pair of latch members on the latch plate for pivotal movement about a common axis between their latched and unlatched positions. An opening is provided in the latch plate, and a latch member projection extends through the opening to provide the contact between the attachment latch members.

As disclosed, the first spring is a helical spring having one end secured to the latch plate on one side thereof and having another end secured to the one attachment latch member to provide the biasing thereof toward its latched position, and the second spring is a torsion spring that is located on the other side of the latch plate extending around the pivot pin and having one end secured to the latch plate and another end secured to the other attachment latch member to provide the biasing thereof into contact with the one attachment latch member at the latch member projection extending through the latch plate opening.

Also, the one attachment latch member is disclosed as having a latching surface with a zero degree pressure angle and the other attachment latch member has a latching surface with a pressure angle in the range of 5.5 to 7.5 degrees. In addition, the one attachment latch member has a ramp surface that is contacted by an associated vehicle striker to provide movement thereof toward its unlatched position and thereby also move the other attachment latch member toward its unlatched position prior to both attachment latch members moving back to their unlatched positions with respect to the striker. Furthermore, a third spring biases the support bracket from its use position toward its storage position.

The latch assembly includes a positioning latch having a positioning latch member movable to a latched position for either limiting movement of the support bracket from its use position or for holding the support bracket in its storage position, and the positioning latch member is also movable to an unlatched position to allow the support bracket to move between its use and storage positions. The positioning latch member of the latch assembly is disclosed as having a pivotal connection providing mounting thereof on the latch plate for pivotal movement between its latched and unlatched positions, and the support bracket includes a latching portion having a use latching surface and a storage latching surface that are respectively engaged by the positioning latch member in its latched position to limit movement of the support bracket from its use position or hold the support bracket in its storage position. The support bracket is also disclosed as including a second position having a storage latching surface that cooperates with the storage latching surface of the first mentioned latching portion and with the latch member in its latched position to hold the support bracket in its storage position, and the second portion of the support bracket has a distal positioning end that contacts the latch plate to limit pivotal movement of the support bracket away from its use position when in its storage position. Also, the previously mentioned third spring is disclosed as a spiral biasing spring that biases the support bracket toward its storage position.

The positioning latch member of the latch assembly is disclosed as including a latching lobe that contacts the support bracket in the latched position upon a predetermined extent of movement of the support bracket from the use position toward the storage position. The positioning latch member also includes an unlatching portion, and an actuator is mounted on the latch plate for movement thereof into contact with the latching portion of the positioning latch member to provide movement thereof to its latched position or for movement of the actuator into contact with the unlatching portion of the positioning latch member to provide movement thereof to its unlatched position. Also, a further spring biases the actuator into contact with the latching portion of the positioning latch member to provide movement thereof to its latched position.

The blocking member disclosed is mounted on the support bracket and is contacted by the attachment latch member upon movement a predetermined extent from its use position to prevent movement of the attachment latch member from its latched position securing the latch plate and the seat cushion to the vehicle. The blocking member is stamped in a unitary, one-piece construction with the support bracket and has curved shape extending around the pivotal axis of the support bracket.

A front latch mechanism of the invention includes a pair of the front latch assemblies connected to each other by a connecting rod. Only one of these front latch mechanisms includes the positioning latch and its actuator.

The objects, features and advantages of the present invention are readily apparent from the following detailed description of the preferred embodiment when taken in connection with the accompanying drawings.

BRIEF DESCRIPTION OF THE DRAWINGS

FIG. 3 is a side view of the seat showing its seat back moved from the generally vertical seating position of FIG. 1 to a generally horizontal storage position.

FIG. 4 is a view showing the seat after the front latch assemblies and the rear latch assemblies have been actuated to permit removal of the seat from the vehicle.

FIG. 5 is a side view of the seat after the rear latch assemblies have been released and shown partially by phantom line representation before storage latch assembly actuation, and shown by full solid line representation after front latch assembly actuation permits movement of the seat cushion to the generally vertical storage position shown with the seat back also in a generally vertical storage position.

DETAILED DESCRIPTION OF THE PREFERRED EMBODIMENT

Figure 1:
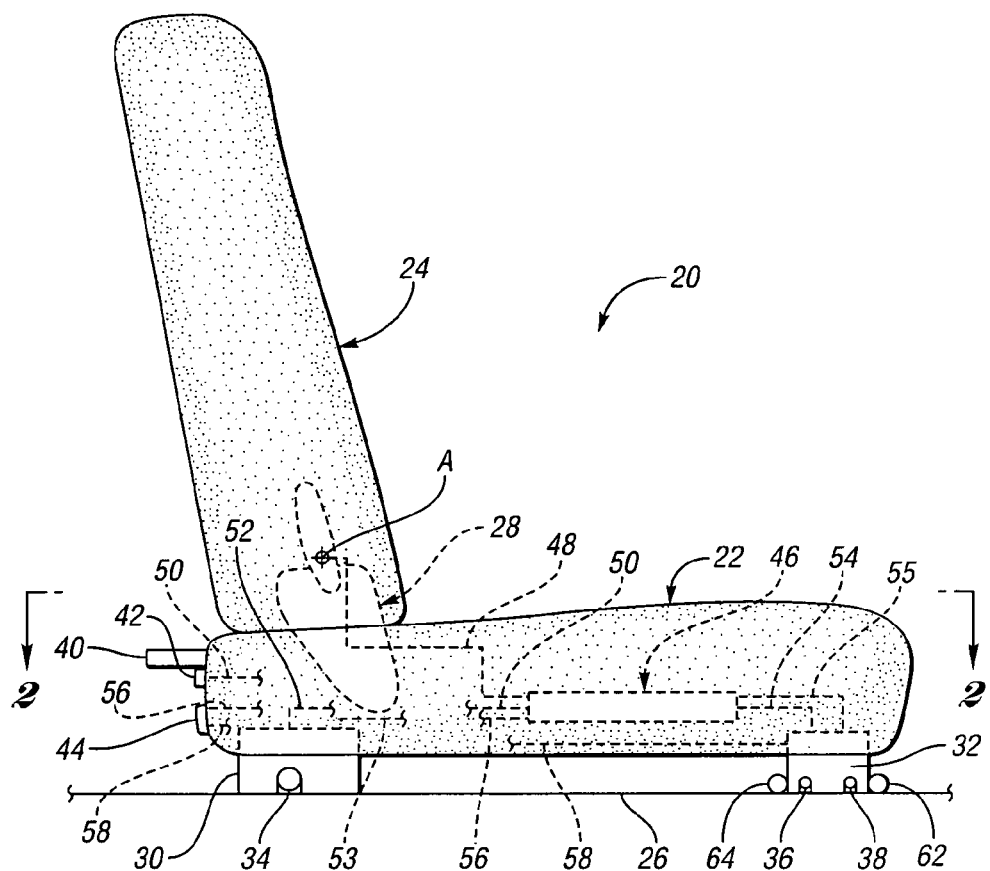
FIG. 1 is a side elevational view of a vehicle seat whose seat cushion has front attachment latch assemblies constructed in accordance with the present invention.

With reference to FIG. 1 of the drawings, a vehicle seat generally indicated by 20 includes a seat cushion 22 and a seat back 24 and is mounted on the floor 26 of an associated vehicle as is hereinafter more fully described. A latch 28, is mounted by a frame of the seat cushion 22 and supports a frame of the seat back 24 for pivoting about an axis A between the generally vertical seating position shown and a horizontal storage position as shown in FIG. 3. The seat cushion 22 is mounted on the vehicle floor 26 by a pair of right and left rear latch assemblies 30, 31 and by a pair of right and left front latch assemblies 32, 33. Rear latch assemblies 30 and 31, which may be of the type disclosed by U.S. Pat. No. 6,945,585 Liu et al. the entire disclosure of which is also hereby incorporated by reference, operate to secure the seat cushion 22 to associated strikers 34 on the vehicle floor 26 as shown in FIG. 1. The front latch assemblies 32, 33 of this invention each secure the seat cushion to a pair of associated strikers 36 and 38 on the vehicle floor as is hereinafter more fully described. A handle actuator 40 of the latch 28 controls the pivoting of the seat back 24 in cooperation with first and second release actuators 42 and 44.

Figure 2:
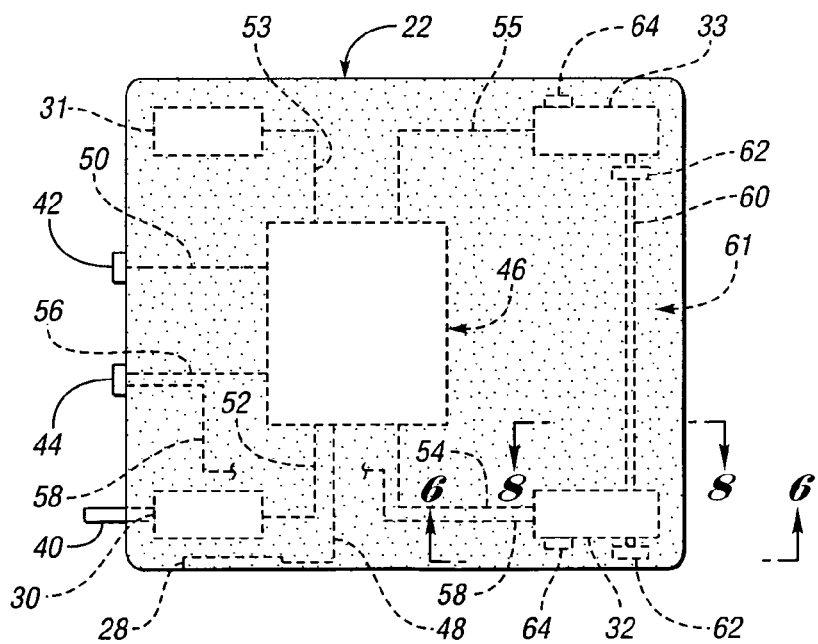
FIG. 2 is a top plan view taken along the direction of line 2-2 in FIG. 1 to shown the seat cushion and the manner in which the front latch assemblies cooperate with a pair of rear latch assemblies under the control of a cable interlock box that is operated by a pair of release actuators and a recliner of the seat to control seat movement and removal.

A conventional cable interlock box 46 schematically shown in FIG. 2 functions to coordinate the control of the front and rear latch assemblies in coordination with the seat back position. More specifically, the recliner 28 has a connection cable 48 to the interlock box 46 and functions to prevent release of the front and rear latch assemblies 30, 31 and 32, 33 when the seat back 24 is in its generally vertical use position of FIG. 1 without being pivoted downwardly to its horizontal storage position of FIG. 3. The first release actuator 42 has a connection cable 50 to the interlock box and cables 52, 53 and cables 54, 55 respectively extend therefrom to the rear latch assemblies 30, 31 and the front latch assemblies 32, 33 to provide release of the front and rear latch assemblies so the seat can be removed from the vehicle as shown in FIG. 4. The second release actuator 44 has a connection cable 56 to the interlock box 46 and also has a connection cable 58 that extends directly to the to the right front latch assembly 32. Operation of the second release actuator 44 through the interlock box 46 releases the rear latch assemblies 30 and 31 and also actuates the right front latch assembly 32 to permit pivoting of the seat from the horizontal position of FIG. 3 first to the partial phantom line partially raised position of FIG. 5 and then to the solid line vertical storage position where both the seat cushion 22 and the seat back 24 extend vertically.

The right and left front latch assemblies 32 and 33 have generally the same construction as each other, except as will be hereinafter described, and are connected to each other by a laterally extending connection rod 60 so as to provide a front latch mechanism 61. Front wheels 62 supported by the connection rod and rear wheels 64 of the front latch assemblies facilitate removal of the seat such as illustrated in FIG. 4.

With reference to FIGS. 6-9, latch assembly 32 includes a latch plate 66 that extends in a generally vertical plane and has rear and front latch hooks 68 and 70 that are respectively engageable with the strikers 36 and 38 to provide securement to the vehicle. An attachment latch 72 of the latch assembly 32 includes a pair of attachment latch members 74 and 76. Each of these attachment latch members is movable between the solid line illustrated latched position in FIGS. 6 and 8 and the partial phantom line illustrated unlatched position with respect to the striker 38. In the unlatched position, the latch assembly 32 is free for upward and rearward movement with respect to the vehicle so that the latch hooks 68 and 70 are released from the strikers 36 and 38.

Figures 6, 7:
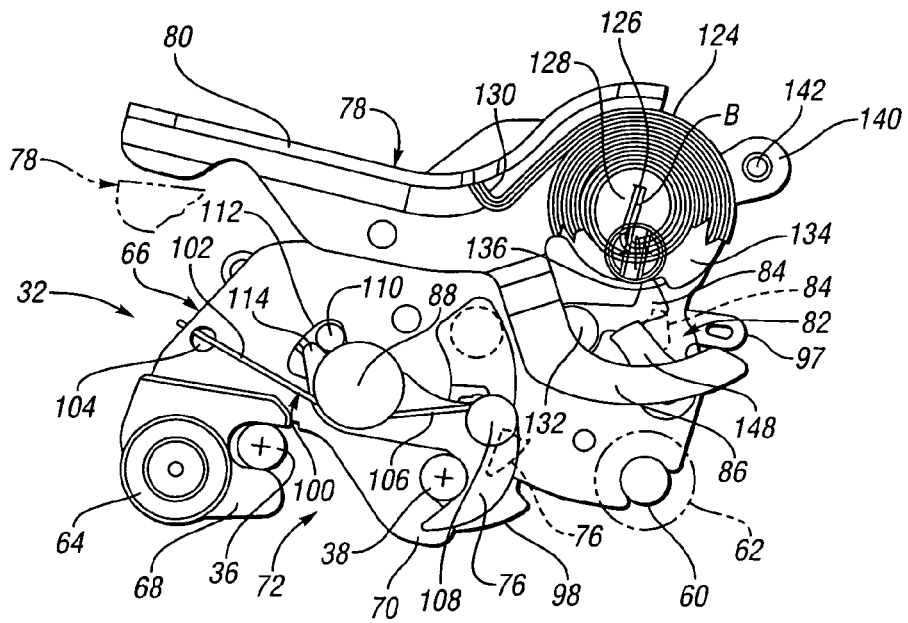
FIG. 6 is a side view of the right front latch assembly of the invention taken along the direction of line 6-6 in FIG. 2 and shown with a partial phantom line illustrated support bracket thereof positioned to support the seat cushion in its horizontal use position shown in FIG. 1 and shown with the full solid line illustrated support bracket in the partially raised position shown by phantom line illustration in FIG. 5.
FIG. 7 is a side view of the right front latch assembly taken in the same direction as FIG. 6 but with its support bracket moved to support the seat cushion in the vertical storage position of FIG. 5.
Figure 8:
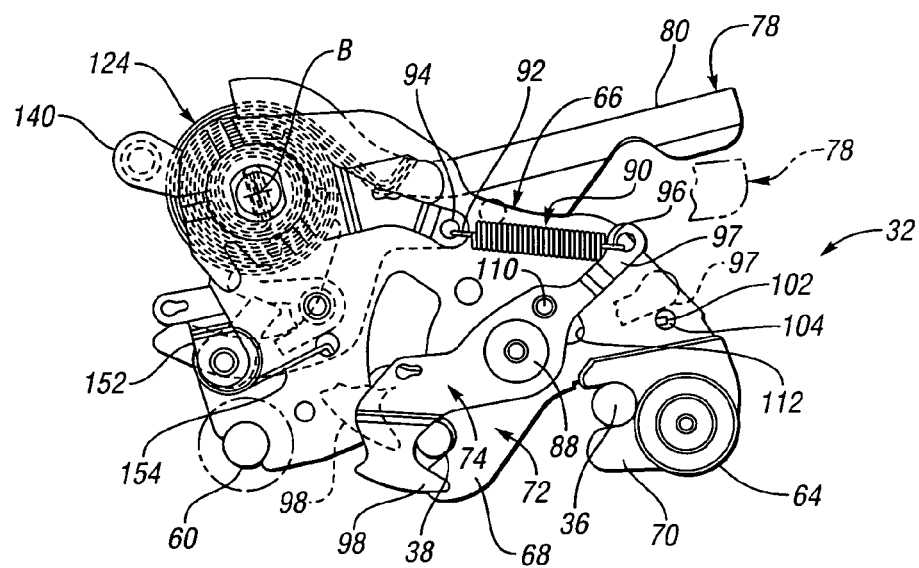
FIG. 8 is a side view of the right front latch assembly taken along the direction of line 8-8 in FIG. 2 with its seat cushion support bracket in the partial phantom line illustrated use position and the full solid line illustration corresponding to the partially raised position shown by phantom line representation in FIG. 5.
Figure 9:
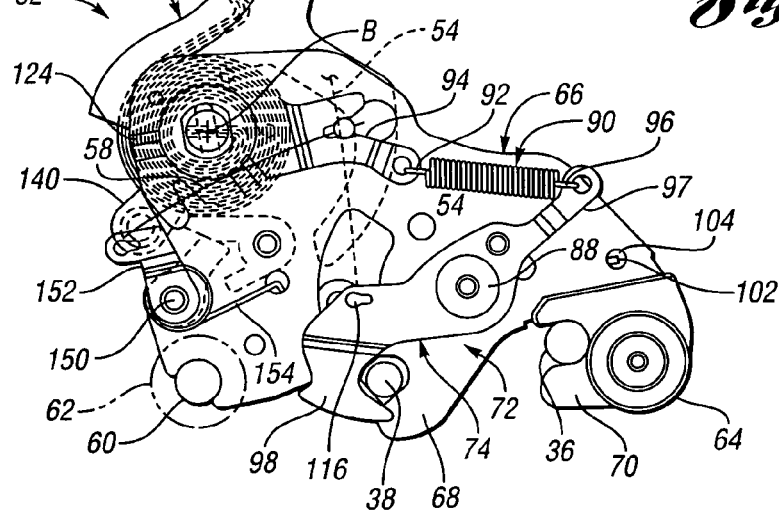
FIG. 9 is a view taken in the same direction as FIG. 8 but with the seat cushion support bracket moved to the storage position corresponding to FIG. 7.

Latch assembly 32 also includes a support bracket 78 pivotally mounted on the latch plate 66 about an axis B for movement between the partial phantom line use position of FIGS. 6 and 8, and the solid line storage position of FIGS. 7 and 9. The support bracket 78 has a support portion 80 for mounting the front end of the vehicle seat cushion such that pivotal movement of the support bracket between the use and storage positions moves the seat cushion on the associated vehicle between the horizontal use position as shown in FIGS. 1 and 3 and the generally vertical storage position as shown in FIG. 5. A positioning latch 82 of latch assembly 32 includes a positioning latch member 84 having a latched position for limiting upward movement of the support bracket 78 from its use position shown by partial phantom line representation in FIGS. 6 and 8 a predetermined extent past the solid line illustrated partially raised solid line position, or holding the support bracket in its storage position shown in FIGS. 7 and 9. The positioning latch member 84 also has a released position shown partially by phantom line representation in FIGS. 6 and 7 to allow the support bracket to move between its use and storage positions as is hereinafter more fully described.

As shown in FIGS. 6 and 7, the latch assembly 32 also includes a blocking member 86 that permits movement of each of the attachment latch members 74 and 76 to their unlatched position when the support bracket 80 is in its partial phantom line use position of FIGS. 6 an 8 or pivoted upwardly toward the storage position no more than a limited extent past the solid line partially raised position which corresponds to the partially raised seat position shown by partial phantom line representation in FIG. 5. The blocking member 80 blocks movement of the attachment latch members 74 and 76 from their latched position to their unlatched position when the support bracket 78 is pivoted upwardly a predetermined extend from its solid line partially raised position of FIG. 6 toward its storage position shown in FIG. 7. Such blocking prevents release of the latch assemblies 32 and 33 and the seat cushion as well as the rest of the seat supported thereby from the vehicle when the seat cushion is moved from its use position of FIG. 3 toward its storage position of FIG. 5. Thus, when the second release actuator 44 shown in FIG. 2 is released to provide the pivoting to the storage position of FIG. 5, inadvertent actuation of the first release actuator 42 will not permit detachment of the front latch assembly from the vehicle.

The pair of attachment latch members 74 and 76 shown in FIGS. 6, 7 and 8, 9 are mounted on opposite sides of the latch plate 66 by a pivotal connector 88 for pivotal movement about a common axis between the latched and unlatched positions with respect to the vehicle striker 38. A first spring 90 is of the helical type and has one end 92 connected to a fixed flange portion 94 of the latch plate 66. Another end 96 of the helical spring 90 is connected to a lever end 97 of attachment latch member 74 on the opposite side of the pivotal connector 88 from its hook portion 98 which cooperates with the striker 38 to provide the latching function.

As shown in FIGS. 6 and 7, a second spring 100 biases the other attachment latch member 76 toward its solid line indicated latched position and permits movement thereof to the partially phantom line illustrated unlatched position against its spring bias. More specifically, the spring 100 is of the torsion type and has one leg 102 fixed within a hole 104 in the latch plate 66 and extends around the pivot pin that provides the pivotal connector 88 to another leg 106 thereof which is hooked around a pin 108 on the latch member 76. This bias by the second spring 100 also contacts the attachment latch member 76 shown in FIGS. 6 and 7 with the attachment latch member 74 shown in FIGS. 8 and 9. More specifically, the attachment latch member 74 shown in FIGS. 8 and 9 has a projection 110 that extends through an opening 112 in the latch plate 66. As shown in FIGS. 6 and 7, this projection 110 is contacted by a lobe 114 of the attachment latch member 76 when the latch member 76 is not engaged with its associated striker but is spaced slightly therefrom when engaged with the striker. Furthermore, the cable 54 previously mentioned extends from the flange portion 94 of the attachment plate 66 to an attachment opening 116 of the attachment latch member 74 such that movement thereof from the latched position to the unlatched position also moves the other attachment latch member 76 from its latched position to its unlatched position by the contact between the projection 110 and lobe 114 of the latch members.

Figure 10:
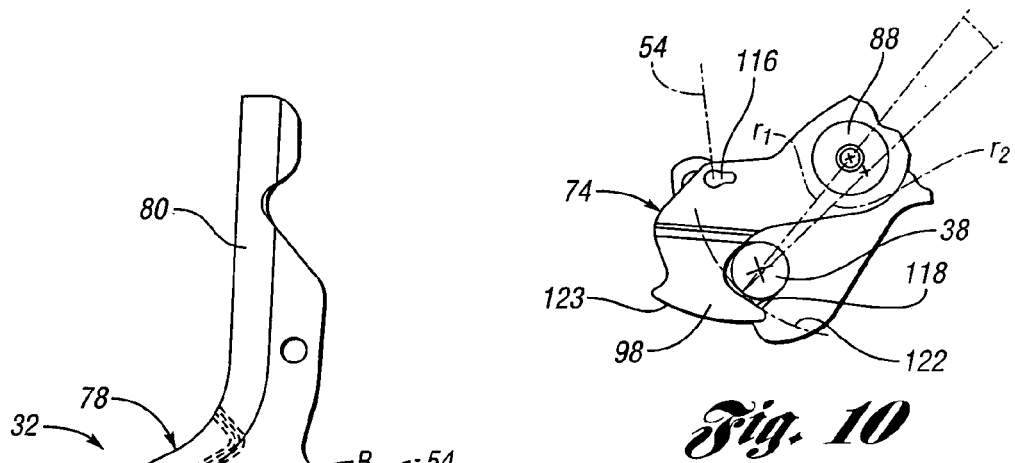
FIG. 10 is a view showing a portion of FIG. 9 and illustrating the manner in which a pair of attachment latch members have different pressure angles.

As shown in FIG. 10, the hook portion 98 of the one attachment latch member 74 has a latching surface 118 that is tangent to a radius $R_1$ extending from the axis of the pivot pin of pivotal connector 88 about which this attachment latch pivots. The latching surface 118 thus has a zero degree pressure angle and is actually just slightly spaced from the associated striker 38 in the latched position to facilitate movement to and from the latched position. Furthermore, the other attachment latch member 76 shown in FIGS. 6 and 7 has a hook portion 120 with a latching surface 122 for engaging the striker 38. As shown schematically in FIG. 10, this latching surface 122 is tangent to a radius $R_2$ that is spaced slightly from the axis of the pivot pin of pivotal connector 88 to define a pressure angle. This pressure angle is in the range of about 5.5 to 7.5 degrees, most preferably 6.5 degrees, and provides direct contact with the striker 38 so as to prevent any buzz, squeak or rattle of the seat. Upon loading, any movement of the attachment latch member 76 from its latched position does not move the attachment latch member 74 toward its unlatched position and its zero degree pressure angle contacts the striker 38 to maintain the latched condition.

The attachment latch member 74 as shown in FIG. 10 has a ramp surface 123 that is contacted by the associated vehicle striker 38 as the seat is initially mounted. This contact moves the attachment latch member 74 toward its unlatched position and thereby through the previously described projection 110 and lobe 114 moves the other attachment latch member 76 toward its unlatched position until both attachment latch members move over the striker and under their spring biasing back to their latched positions securing the latch assembly to the striker.

As best shown in FIGS. 6 and 7, the latch assembly 32 also includes a spring 124 that biases the support bracket 78 from its use position shown in FIG. 6 toward its storage position shown in FIG. 7 so as to effectively provide a counterbalance that assists in the upward pivoting of the seat from its FIG. 2 position to its FIG. 5 position. The spring 124 is of the spiral type having an inner end 126 fixed at a pivotal connection 128 that mounts the support bracket 78 on the latch plate 66 for its pivotal movement about axis B. An outer end 130 of spiral spring 124 engages the support bracket 78 adjacent its support portion 80 to provide the pivotal biasing of the support bracket from its FIG. 6 use position toward its FIG. 7 storage position.

As best shown in FIG. 7, the positioning latch member 84 of the positioning latch 82 has a pivotal connection 132 that provides support thereof for movement between the solid line indicated latched position and the partial phantom line indicated unlatched position. The support bracket 78 has a latching portion 134 having a use latching surface 136 (FIG. 6) and a storage latching surface 138 (FIG. 7). These use latching surface 136 is contacted by the positioning latch member 84 in its latched position to hold the support bracket against movement more than a limited predetermined extent from its use position toward its storage position. This contact takes place after the support bracket 78 has pivoted slightly about its solid line partially raised position of FIGS. 6 and 8 and prevents the latch assembly from being pivoted by spring 124 with respect to the seat cushion 22 upon being removed from vehicle as shown in FIG. 4 after being released from strikers 36 and 38. Also, friction between the positioning latch member 84 and the latching portion 134 under the bias of spring 124 prevents inadvertent unlatching by second release actuator 44. Furthermore, the support bracket 78 as shown best in FIG. 7 also includes a second portion 140 that cooperates with the storage latching surface 138 of the latching lobe 134 to hold the support bracket in its storage position. Furthermore, the second portion 140 has a distal positioning end including a positioning pin 142 (FIG. 7) that contacts the latch plate to limit pivotal movement of the support bracket away from its use position when in its storage position.

As best illustrated in FIG. 7, the positioning latch member 82 includes a latching portion 144 that engages the support bracket 78 in the latched position to selectively position the support bracket as described above, and the positioning latch member also includes an unlatching portion 146. An actuator 148 is pivotally mounted on the latch plate 66 by a pivot pin 150 and is movable clockwise to contact the latching portion 144 and move the positioning latch member 82 to its latched position. Counterclockwise rotation of the actuator 148 contacts it with the unlatching portion 144 of the positioning latch member 82 for movement to the unlatched position. On the opposite side of the latch plate from the actuator 148, the pin 150 as shown in FIG. 9 supports an actuating lever 152 that is biased in a counterclockwise direction by a torsion spring 154. This bias corresponds to biasing of the actuator 148 to contact the latching portion 144 in order to bias the positioning latch member 82 toward its latched position. Actuating lever 152 shown in FIG. 9 is connected to the cable 58 whose actuation moves the lever 152 and hence the actuator 148 against the bias of spring 154 to provide the unlatching of the positioning latch 82.

With reference to FIGS. 6 and 7, the blocking member 86 is mounted on the support bracket 78 and is contacted by attachment latch member 78 at its pin 108 upon clockwise movement of the support bracket a predetermined limed extent from its full line partially raised position shown in FIG. 6. This contact blocks movement of both of the attachment latch members 74 and 76 from their latched position and thereby secures the latch plate and the seat cushion to the vehicle. More specifically, the movement of the support bracket 78 clockwise from the FIG. 6 position moves the blocking member 86 so that attempted counterclockwise rotation of the attachment latch members 74 and 76 engages the pin 108 with the blocking member. More specifically, the blocking member is stamped in a unitary, one-piece construction with the support bracket and has a curved shape extending around the pivotal axis B of the support bracket on the latch plate 66.

The left front latch assembly 33 shown in FIG. 2 has generally the same construction as the right front latch assembly 32 described above except that it does not have the positioning latch 82 and associated actuator 148 since the positioning provided at one lateral side of the seat is sufficient for holding the seat in either the use position of FIG. 3 or storage position of FIG. 5.

While the preferred embodiment of the invention has been illustrated and described, it is not intended that this embodiment illustrates and describes all possible forms of the invention. Rather, the words used in the specification are words of description rather than limitation, and it is understood that various changes may be made without departing from the spirit and scope of the invention.

What is claimed is:

1. A latch assembly for supporting a front end of a vehicle seat cushion of a vehicle seat on an associated a vehicle, the latch assembly comprising:

a latch plate;

an attachment latch including an attachment latch member mounted on the latch plate for movement between a latched position and an unlatched position with respect to a vehicle striker to secure or release the latch plate with respect to the vehicle;

a support bracket pivotally mounted on the latch plate for pivotal movement about a pivotal axis between a use position and a storage position, and the support bracket having a support portion for mounting the front end of the vehicle seat cushion such that pivotal movement of the support bracket between the use and storage positions moves the seat cushion on the associated vehicle between a generally horizontal use position and a generally vertical storage position; and a blocking member that permits movement of the attachment latch member from its latched position to its unlatched position when the support bracket is in its use position but blocks movement of the attachment latch member from its latched position to its unlatched position when the support bracket is moved from its use position a predetermined extent toward its storage position such that the blocking prevents release of the latch assembly and the seat cushion from the vehicle when the seat cushion is moved the predetermined extent from its use position toward its storage position.

2. A latch assembly as in claim 1 wherein the attachment latch includes a pair of attachment latch members pivotally mounted on opposite sides of the latch plate for movement between latched and unlatched positions with respect to the vehicle striker.

3. A latch assembly as in claim 2 and further including a first spring that biases one of the attachment latch members toward its latched position, a second spring that biases the other attachment latch member toward its latched position and into contact with the one attachment latch member so as to move therewith to the unlatched position.

4. A latch assembly as in claim 3 further including a pivotal connection having a pivot pin that pivotally mounts the pair of latch members on the latch plate for pivotal movement about a common axis between their latched and unlatched positions, an opening in the latch plate, and a latch member projection that extends through the opening to provide the contact between the attachment latch members.

5. A latch assembly as in claim 4 wherein the first spring is a helical spring having one end secured to the latch plate on one side thereof and another end secured to the one attachment latch member to provide the biasing thereof toward its latched position, and the second spring being a torsion spring that is located on the other side of the latch plate extending around the pivot pin and having one end secured to the latch plate and another end secured to the other attachment latch member to provide the biasing thereof toward contact with the one attachment latch member at the latch member projection extending through the latch plate opening.

6. A latch assembly as in claim 3 wherein the one attachment latch member has a latching surface with a zero degree pressure angle and wherein the other attachment latch member has a latching surface with a pressure degree angle in the range of 5.5 to 7.5 degrees.

7. A latch assembly as shown in claim 3 wherein the one attachment latch member has a ramp surface that is contacted by an associated vehicle striker to provide movement thereof toward its unlatched position and thereby also move the other attachment latch member toward its unlatched position prior to both attachment latch members moving back to their latched positions with respect to the striker.

8. A latch assembly as in claim 3 further including a third spring that biases the support bracket from its use position toward its storage position.

9. A latch assembly as in claim 1 further including a positioning latch having a positioning latch member movable to a latched position for either limiting movement of the support bracket from its use position or for holding the support bracket in its storage position, and the positioning latch member is also moveable to an unlatched position that allows the support bracket to move between its use and storage positions.

10. A latch assembly as in claim 9 wherein the positioning latch member has a pivotal connection providing mounting thereof on the latch plate for pivotal movement between its latched and unlatched positions, and the support bracket including a latching portion having a use latching surface and a storage latching surface that are respectively engaged by the positioning latch member in its latched position to limit movement of the support bracket from its use position or hold the support bracket in its storage position.

11. A latch assembly as in claim 10 wherein the support bracket includes a second portion having a storage latching surface that cooperates with the storage latching surface of the first mentioned latching portion and with the latch member in its latched position to hold the support bracket in its storage position, and the second portion of the support bracket having a distal positioning end that contacts the latch plate to limit pivotal movement of the support bracket away from its use position when in its storage position.

12. A latch assembly as in claim 11 further including a spiral biasing spring that biases the support bracket toward its storage position.

13. A latch assembly as in claim 10 wherein the positioning latch member includes a latching portion that engages the support bracket in the latched position, the positioning latch member also including an unlatching portion, and an actuator mounted on the latch plate for movement thereof into contact with the latching portion of the positioning latch member to provide movement thereof to its latched position or for movement of the actuator into contact with the unlatching portion of the positioning latch member to provide movement thereof to its unlatched position.

14. A latch assembly as in claim 13 further including a spring that biases the actuator into contact with the latching portion of the positioning latch member to provide movement thereof to its latched position.

15. A latch assembly as in claim 1 wherein the blocking member is mounted on the support bracket and is contacted by the attachment latch member upon movement a predetermined extent from its use position to prevent movement of the attachment latch member from its latched position securing the latch plate and the seat cushion to the vehicle.

16. A latch assembly as in claim 15 wherein the blocking member is stamped in a unitary, one-piece construction with the support bracket and has a curved shape extending around the pivotal axis of the support bracket.

17. A latch assembly for supporting a front end of a vehicle seat cushion of a vehicle seat on an associated a vehicle, the latch assembly comprising:
  a latch plate;
  an attachment latch including a pair of attachment latch members pivotally mounted about a common axis on opposite sides of the latch plate for movement between latched and unlatched positions to secure or release the latch plate with respect to the vehicle;
  a support bracket pivotally mounted on the latch plate for pivotal movement about a pivotal axis between a use position and a storage position, and the support bracket having a support portion for mounting the front end of the vehicle seat cushion such that pivotal movement of the support bracket between the use and storage positions moves the seat cushion on the associated vehicle between a generally horizontal use position and a generally vertical storage position;
  a positioning latch including a positioning latch member having a latched position for either limiting movement of the support bracket from its use position or for holding the support bracket in its storage position and having an unlatched position that allows the support bracket to move between its use and storage positions; and
  the support bracket including a blocking member that permits movement of the attachment latch member from its latched position to its unlatched position when the support bracket is in its use position but blocks movement of the attachment latch member from its latched position to its unlatched position when the support bracket is moved a predetermined extent from its use position toward its storage position to prevent release of the latch assembly and the seat cushion from the vehicle when the seat cushion is moved from its use position the predetermined extent toward its storage position.

18. A latch mechanism for supporting a front end of a vehicle seat cushion of a vehicle seat on an associated a vehicle, the latch mechanism comprising:
  a pair of front latch assemblies and a connecting rod that extends laterally between the pair of front latch assemblies;
  each front latch assembly including:
  a latch plate;
  an attachment latch including a pair of attachment latch members pivotally mounted about a common axis on opposite sides of the latch plate for movement between latched and unlatched positions to secure or release the latch plate with respect to the vehicle;
  a support bracket pivotally mounted on the latch plate for pivotal movement about a pivotal axis between a use position and a storage position, and the support bracket having a support portion for mounting the front end of the vehicle seat cushion such that pivotal movement of the support bracket between the use and storage positions moves the seat cushion on the associated vehicle between a generally horizontal use position and a generally vertical storage position; and the support bracket including a blocking member that permits movement of the attachment latch member from its latched position to its unlatched position when the support bracket is in its use position but blocks movement of the attachment latch member from its latched position to its unlatched position when the support bracket is moved a predetermined extent from its use position toward its storage position to prevent release of the latch assembly and the seat cushion from the vehicle when the seat cushion is moved the predetermined extent from its use position toward its storage position; and one of the front latch assemblies including a positioning latch that includes a positioning latch member having a latched position for limiting movement of the support bracket from its use position or for holding the support bracket in its storage position, and the positioning latch member having an unlatched position that allows the support bracket to move between its use and storage positions.

* * * * *

UNITED STATES PATENT AND TRADEMARK OFFICE
CERTIFICATE OF CORRECTION

PATENT NO. : 7,367,604 B2  Page 1 of 1
APPLICATION NO. : 11/314105
DATED : May 6, 2008
INVENTOR(S) : Michael P. Miller et al.

It is certified that error appears in the above-identified patent and that said Letters Patent is hereby corrected as shown below:

Column 8, Line 22, Claim 1:

Delete "a" - second occurrence.

Column 10, Line 16, Claim 17:

Delete "a" - second occurrence.

Column 10, Line 53, Claim 18:

Delete "a" - second occurrence.

Signed and Sealed this

Twenty-sixth Day of August, 2008

JON W. DUDAS
*Director of the United States Patent and Trademark Office*